United States Patent [19]

Geisinger

[11] 4,415,399
[45] Nov. 15, 1983

[54] HANDLE APPLICATOR

[76] Inventor: Wolfgang Geisinger, 352 Rosemere Blvd., Rosemere, Quebec, Canada, J7A 2T5

[21] Appl. No.: 380,017

[22] Filed: May 19, 1982

[51] Int. Cl.³ .............................................. B32B 1/00
[52] U.S. Cl. .................................. 156/475; 156/486; 156/489; 156/518; 156/521
[58] Field of Search ............... 156/443, 556, 517, 518, 156/521, 475, 486, 492; 493/88, 226; 53/413, 134

[56] References Cited
U.S. PATENT DOCUMENTS
3,306,802 2/1967 Wilcox et al. ................. 156/521 X
3,834,970 9/1974 Mitsuoka et al. .............. 156/521 X Primary Examiner—David A. Simmons
Attorney, Agent, or Firm—C. A. Rowley

[57] ABSTRACT

A handle applicator having a first and second gripping means movable alternatively between a pick-up station and an application station applying handles to articles delivered to the application station, when an article and one of the gripping means carrying a handle are in position, an applicator moves to press ends of a strap handle (with adhesive pre-applied) carried by the gripping mechanism onto the article and the article with handle applied thereto is ejected from the application station.

6 Claims, 8 Drawing Figures

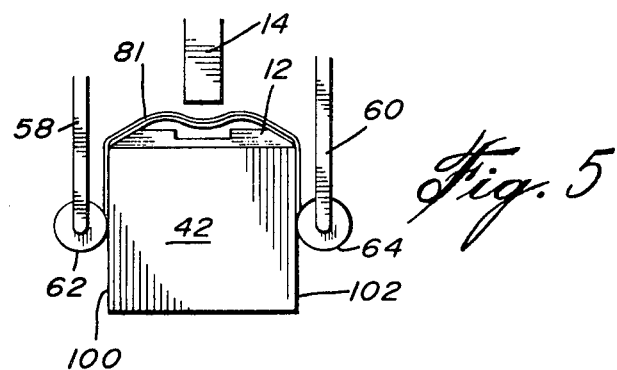
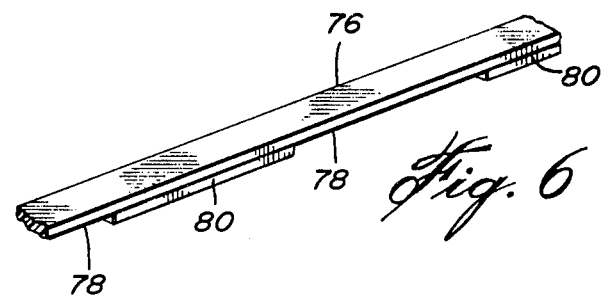
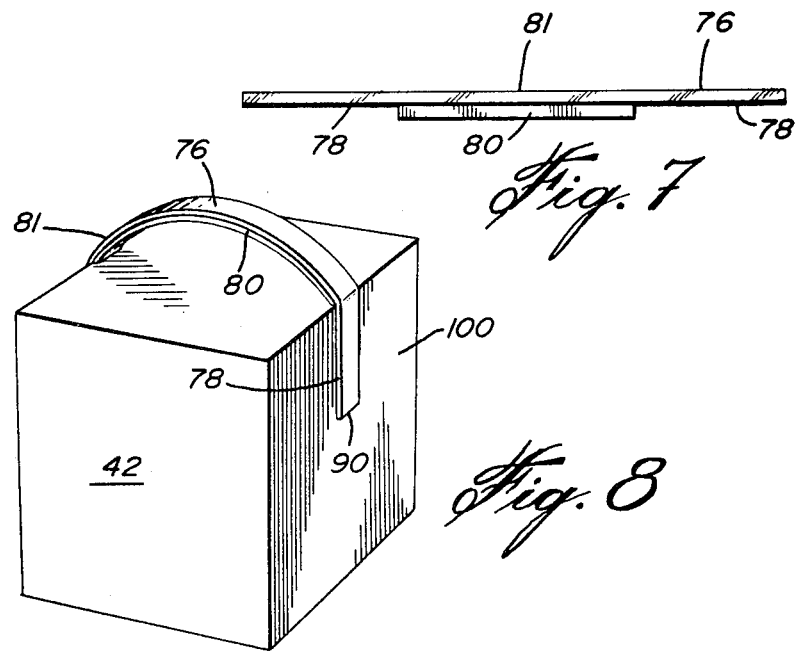

HANDLE APPLICATOR

FIELD OF THE INVENTION

The present invention relates to a handle applicator. More particularly the present invention relates to a device for automatically forming and applying adhesively a strap handle to an article.

BACKGROUND OF THE INVENTION

No simple and effective means for automatic positioning and applying a strap handle to an article is currently available.

It has been proposed to utilize a strap type handle formed from two materials, namely an adhesive strip with a handle (longer than the adhesive strip) connected to the strip and projecting upwardly from an adhesive side to the non-adhesive side and back again through the adhesive strip which connects the handle to an article. Normally, such handles are dispensed from a dispenser and applied manually to an article to be carried.

BRIEF DESCRIPTION OF THE INVENTION

It is the object of the present invention to provide a machine for forming, positioning and applying a tape handle with adhesive pre-applied thereto to an article, such as a carton.

Broadly the present invention relates to a handle applicator comprising: a first and second gripping and pulling means, means to move said gripping means alternatively to and from a pick-up station and an application station, means to deliver articles to application station, means to apply a handle supported by one of said gripping means in said application station to said article, means to retract said gripping means of said handle applicator and means to eject said article of said handle applied from said application station.

BRIEF DESCRIPTION OF THE DRAWINGS

Further features, objects and advantages will be evident from the following detailed description of the preferred embodiments of the present invention taken into conjunction with the accompanying drawings in which:

FIG. 5 is a partial view similar to FIG. 4 illustrating the handle applicator positioned with the clamping mechanism closed over a handle.

FIG. 6 is an isometric view of the tape from which a handle may be cut.

FIG. 7 is an isometric view of a handle per se.

FIG. 8 is an isometric view of an article with a handle applied thereto.

DESCRIPTION OF THE PREFERRED EMBODIMENTS

Figure 1:
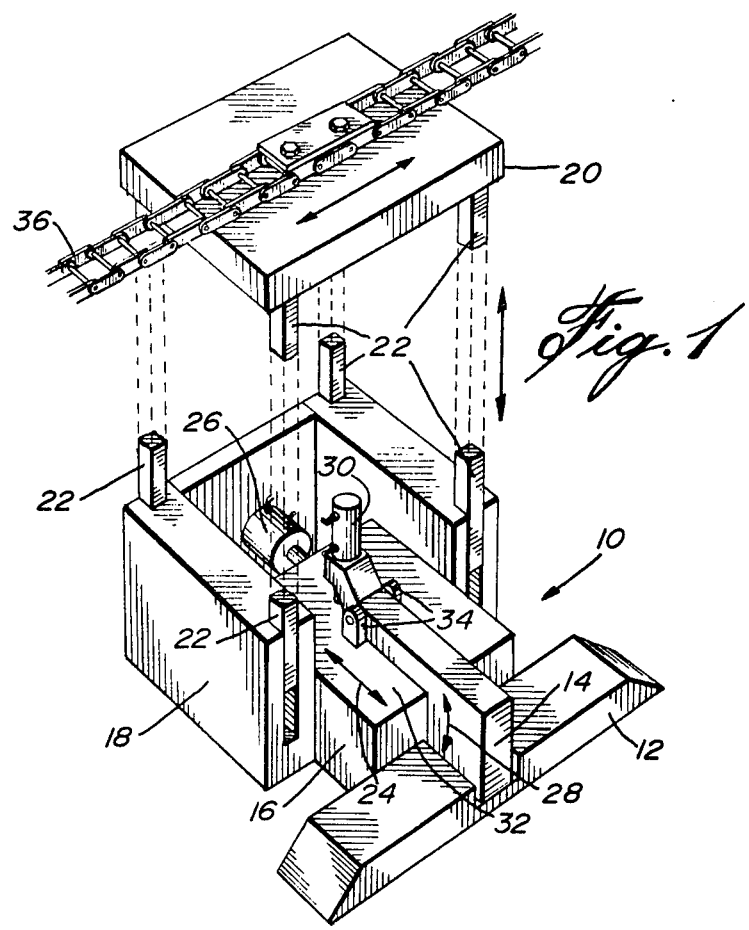
FIG. 1 is a partially exploded isometric view of a gripping mechanism constructed in accordance with the present invention.

Referring to FIG. 1, the gripping mechanism generally indicated at 10 comprises, an anvil member 12 and a clamping member 14. The anvil member 12 is mounted on a body member 16 which in turn is mounted within a suitable carriage 18 slung beneath a mobile platform 20, suspended on a plurality of suspending arms 22 which may be used to adjust the height of the handle member 12 in accordance with the height and size of the package and/or handle to be applied.

The body member is movable forward and backward as indicated by the arrow 24 by means of a suitable piston and cylinder arrangement generally indicated at 26 which may be, for example, an electric solenoid device or preferrably a pneumatic piston and cylinder. Similarly, the clamping member 16 is movable up and down as indicated by the arrow 28 via a similar suitable piston and cylinder mechanism 30, the piston member of the mechanism 30 bears against the upper face 32 of the body member 16 to force the clamping mechanism 14 to pivot around its pivotal mounting indicated at 34 to move the clamp mechanism 14 toward or away from the anvil member 12 to clamp or release a handle of the anvil 12.

The carriage 20 is moved between a pick-up position and an application position by a suitable drive means schematically indicated by the chain belt 36 which may be wrapped around and driven in one direction or the other via a suitable clutching mechanism. It is important that there be accurate control on the precise position of the platform 20 particularly at opposite ends of its travel i.e. in the pick-up or application station i.e. the drive mechanism to chain 26 or other suitable means for the platform 20 must be able to accurately position the anvil member 12 in both the applicator and the pick-up position by a suitable positive breaking and clutching mechanism in accordance with the movement of the device to the desired distance to and from the pick-up and the application stations.

Figure 3:
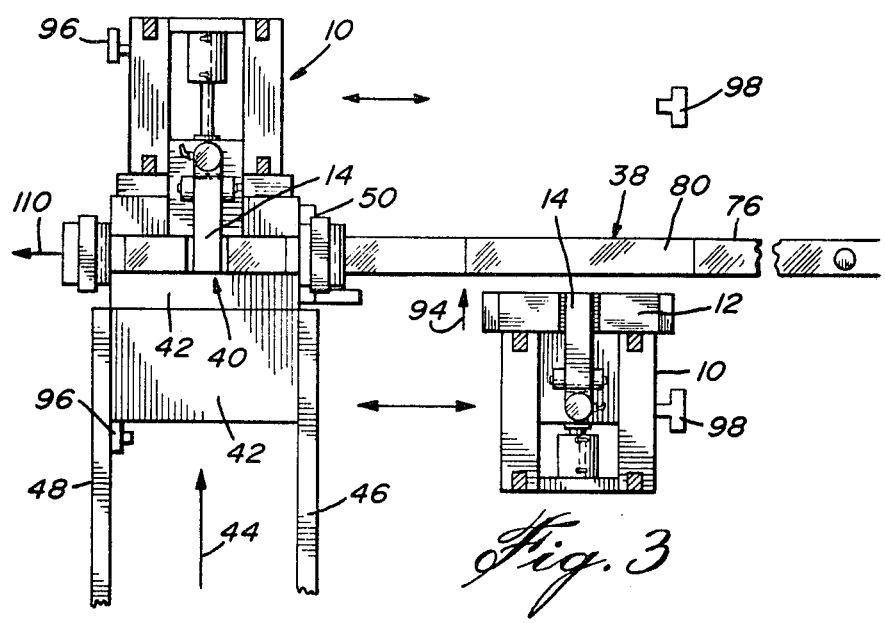
FIG. 3 is a schematic plan view of the handle applicator mechanism of the present invention.

The pick-up station is shown at 38 in FIG. 3 while the applicator station is generally indicated at 40 in the same figure. These stations or positions are similarly indicated in FIG. 4.

The applicator position 40 is provided with a suitable infeed conveyor for moving the article, such as the articles 42 in the direction of the arrow 44 between a pair of guides 46 and 48 into position in the applicator position 40 and a suitable pusher 50 ejects the article with the handle applied from the device.

Figure 4:
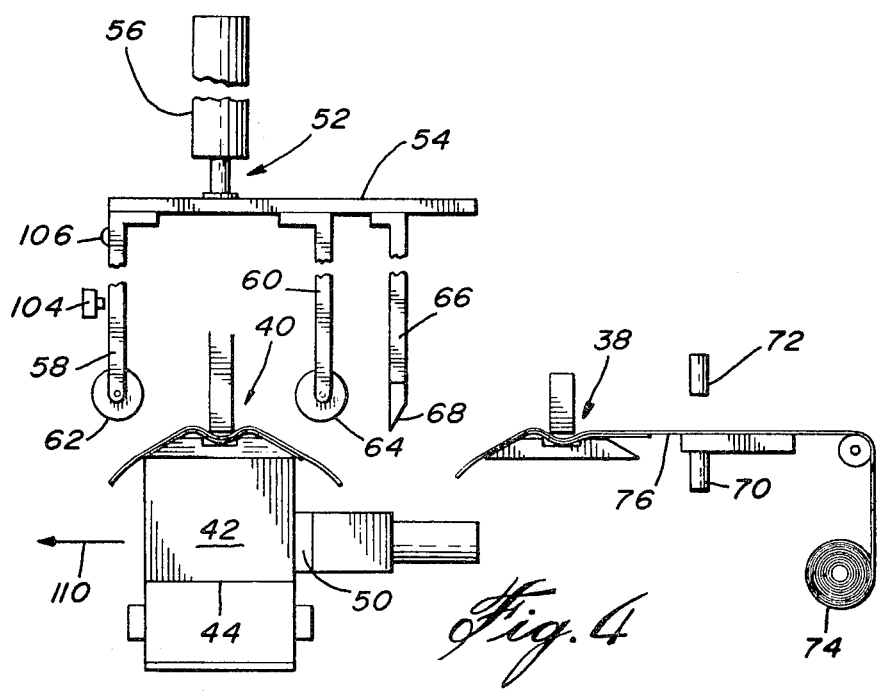
FIG. 4 is a side elevation schematically illustrating the present invention.

In the handle applicator position, a suitable applicator generally indicated at 52 in FIG. 4 is reciplicated from a retracted position as illustrated in FIG. 4 to an extended applicating position as indicated in FIG. 5. The applicator 52 generally has a movable platform 54 which is movable relative to the frame of the apparatus by a suitable piston and cylinder arrangement 56. Suspended from the platform 54 are a pair of substantially verticle legs 58 and 60 having mounted at their bottom ends flexible applicator rolls 62 and 64 respectively. These applicator rolls 62 and 64 may be made of soft sponge material or the like and are easily deflected as the periphery of the rolls contact the article to which the handle is being applied, such as the article 42 in FIG. 4.

A suitable cut-off mechanism generally indicated by the numeral 66 and having a sharp cutting edge 68 may be provided if a continuous length of handle members is used and the handle members are to be severed between the pick-up station and application station 38 and 40.

The arms 58 may be adjustably positioned on the platform 54 as may the cut-off mechanism 66. Similarly the length of these members projecting below the platform 54 may be varied to accommodate different heights of articles 42 (no particular means has been shown for this purpose but a variety of different means may be used for example, the legs 58 or 60 or the mechanism 66 may simply telescope the lockable different indicated positions).

In the pick-up station 38 a suitable detector is provided by the light source 70 and the detector 72 to determine the position of the continuous web of handles dispensed with suitable dispensing i.e. such as a dispensing roll generally indicated at 74. This detector will detect a pre-set position or mark on the handle member and will adjust the stroke of the platform 20 periodically in a well known manner to ensure that any error in the position of the tape imparted e.g. by the stretching of the tape is not accumulated and accommodated by periodically overfeeding or underfeeding the anvil member 12.

As shown in FIG. 6, the handle may be in the form of a continuous tape such as that indicated at 76. Preferably it will be comprised of a transparent tape or the like having an adhesive layer on its under surface as indicated at 78 with discrete patches 80 uniformly spaced along the length of the tape in the area to be gripped when carrying the article to which the handle is applied. These patches 80 preferably are opque and seal the adhesive surfaces 78 so that in the area of the patches 80 the adhesive 78 is not exposed. Alternatively, discrete handle members may be fed from a suitable magazine. However, a magazine for handling such adhesively applied handles is not a simple magazine and therefore the utilization of a continuous roll is preferred (it is also possible to fabricate the handle tape 76 and patches 80 directly on the machine immediately preceeding the station 38 by a suitable well known applicator).

Figure 2:
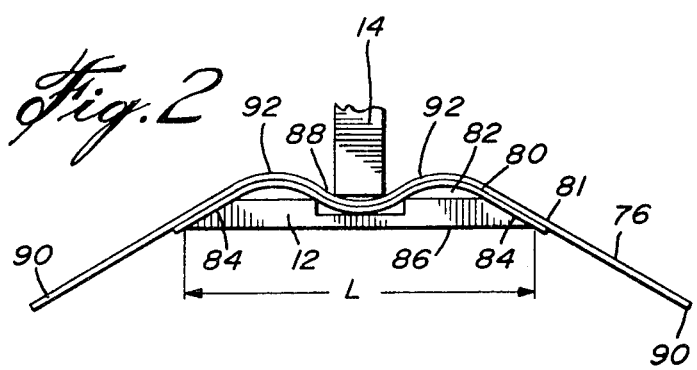
FIG. 2 is a front planned view of the gripping mechanism with a handle supported and gripped thereon.

The shape of the anvil member 24 and its cooperating clamping member 14 is important. As shown in FIG. 2, the anvil member 12 has an upper face 82 with a pair of end edges 84 tapering from the upper face 82 to the bottom surface 86 of the anvil member 12. A central groove or slot 88 wider than the clamping mechanism 14 is provided on the upper surface 82. The length of the anvil member et al is correlated with length of the carton or article to which the handle is to be applied and preferably will be slightly narrower than the article. The minimal length of the member 24 depends on the depth of the centre slot 88 and the degree to which the clamping member 14 penetrates this slot 88 as well as the relative size of the clamping member 14 and slot 88 which determines the deflection of handle 81. The function of the anvil in cooperation with the clamp 14 is to deflect the handle into a gull shape as illustrated in FIG. 2 so that the free ends of the handle do not project down sufficiently (clearance between the anvil and article) to interfere with the article as the anvil member carrying the handle is moved to the applicator position. In FIG. 2 the deflection downwardly has been greatly exaggerated to show the concept. Normally this handle member 81 will lay substantially horizontally on the anvil member 12 and will not drape over the edges as far as indicated. The curvature of the handle as indicated at 92 is very important in ensuring that the handle ends simply don't sag into a substantially vertical position. This is attained by properly coordinating the resliency of the tape member 76 with the penetration of the clamping member 14 into the slot 88 in the anvil 12 the relative width of the member 14 and slot 88, and by properly shaping the ends 84 and length L of the anvil member. It is important that the length L never exceeds to a substantial extent of the length of the package (extending in the longitudinal direction of the anvil) to which the handle supported by the anvil is to be applied.

In operation, assuming a tape with pre-applied patches 80 is being dispensed from a roll 74 as would normally be the case, the tape 76 is pre-threaded into the pick-up station 38 where it may be gripped by one of the pair of mechanisms 10. In the schematic arrangement shown in FIG. 3 the lower member 10 is in the pick-up position and the anvil is about to be extended in the direction of the arrow 94 into position to pick-up the tape 76 i.e. the anvil will underlie the area of a patch 80. When the anvil member 12 is extended from the gripping mechanism 10 in the pick-up position 38 the clamping member 14 is moved into clamping position and clamps the tape in the manner illustrated in FIG. 2. The machine is then activated and the mechanism 10 that was in the clamping position is moved into the applicator position 40 as shown in FIG. 3 by the upper gripping mechanism 10 and the other mechanism 10 to the pick-up position 38. Movement of these devices may be controlled by suitable limit switches such as those indicated at 96 for the applicator station 40 and 98 for the pick-up station 38. However, these limit switches may be overridden on occasion or the stroke shortened on occasion if the sensors 70 and 72 detect that the marking (not shown) or the edge of the opaque patch 80 is out of position. Such a correcting move will only be required periodically primarily because of the stretch of the tape. In any event, the tape is extended from the pick-up position into the applicator position 40 as shown in FIGS. 3 and 4 (suitable means (not shown) insures the tape held by the gripping and clamping mechanism 10 is under tension toward the unwind station where the roll 74 is mounted). In this position, the applicator mechanism 52 is lowered by the piston and cylinder arrangement 56 which lowers the platform 54 and the arms 58 and 60 attached thereto as well as the cut-off mechanism 66. Cut-off knife 68 first engages, cuts the ribbon or tape 76 between the pick-up station and the applicator station and then the rollers 62 and 64 engage the ends of the handle 80 i.e. the free ends 90 projecting beyond the anvil member 12 as shown in FIG. 2 and wipe these edges down along the outer faces of the carton or article 42 i.e. along the outer faces 100 and 102 respectively so that the adhesive on the lower face of the tape 76, namely the adhesive 78 preferably a pressure sensitivity adhesive will secure the handle member 81 to the side of the article to provide a handled article as illustrated in FIGS. 5 and 8.

After the platform 54 has been lowered sufficiently as may be determined by a suitable limit switch 104 activated by a dog or the like at 106 on the arm 58, the piston cyclinder arrangement 56 will be immediately reacted in the opposite direction to retract the cut-off mechanism 66 and the rolls 62 and 64 to the elevated position and leaving the handle applied to the article 42.

When the rollers 62 and 64 are substantially in their lower most position, the first clamping mechanism 14 of the mechanism 10 in the application station 40 is raised to its opened position as shown in FIG. 5 so that it is clear of the anvil member 12 and releases the handle 81. The body member 16 is then retracted carrying with it the anvil member 12 and the clamping member 14. At this point in time, the clamping mechanism 10 positioned in the applicator station is free to return to the pick-up station 38. This operation is commenced while simultaneously the other clamping mechanism 10 in the pick-up station 38 with the clamp member 14 in closed position moves toward the applicator station 40 which extends or pulls the tape 76 from the roll 74 and moves the tape and handle into position 40 shown in FIG. 3. Before the platform 54 is lowered, the first pick-up mechanism 10 which is now in the pick-up station 38 moves to extend the anvil member 12 and close the clamp 14 to engage the handle tape 76 in the pick-up station 38 i.e. when the pick-up mechanism 10 is properly positioned in the application station 38 the body member 16 carrying the anvil member 12 and the clamp 14 of the pick-up mechanism 10 in the pick-up station 38 is extended with the anvil 12 beneath the strip 76 and the clamp 14 thereabove and the clamp is closed. With the clamp 14 closed both clamping mechanism 10 and the platform 54 may be lowered to sever the taper 76 between the pick-up station 38 and the application station 40.

This alternate positioning of the two pick-up mechanisms 10 in the pick-up station 38 or application station 40 i.e. reciplicating alternating action may be carried out in a routine manner to position the handle members in the application station 40. Suitable articles or packages 42 are moved via the conveyor 44 into the application station 40. The ejector 50 moves the article with handle 81 applied thereto out of this station 40 as indicated by the arrow 110 in FIGS. 3 and 4. This mechanism 50 is immediately retracted to permit the next article 42 to move into position as the mechanism 10 carrying the tape from station 38 moves into position in the station 40. If there is an article in position it may be detected by a suitable limit switch (not shown) and with a clamping mechanism in position in the station 40 or the override compensation mechanism activated by the detector 72 as detected by the limit switch, platform 54 may be lowered to sever the tape and apply the handle.

Modifications may be evident to those skilled in the art without departing from the spirit of the invention as defined in the appended claims.

I claim:

1. A handle applicator comprising; a first and a second gripping means, means to reciprocate each of said gripping means to alternately move each said gripping means to and from a pick-up station and an application station, each of said gripping means including an anvil member and a clamping member adapted to cooperate with said anvil member and hold a handle on said anvil member, means to deliver articles to said application station and means to apply a handle supported by one of said anvil members in said application station to said article, means to move articles with handles applied thereto from each application station.

2. A handle applicator as defined in claim 1 wherein said gripping means comprises; a carriage, a body member on said carriage, said clamping member and said anvil member mounted on said body member, means to move said body member from a retracted position to an extended position in said pick-up station, and from said extended position to said retracted position in said application station.

3. An apparatus as defined in claim 2 wherein said handle is formed from a substantially continuous tape having spaced patches with adhesive exposed therebetween, wherein said anvil members engage said strip beneath said patches wherein a cut-off mechanism is provided between said application station and said pick-up station adapted to cut-off discrete lengths of said tape and form a handle member having exposed adhesive at opposite ends and said patch positioned substantially in the middle thereof.

4. An apparatus as defined in claim 3 wherein said means to apply comprising a wiping means adapted to move down each side of the article and wipe the adhesive ends of said handle against the adjacent surface of said article.

5. An apparatus as defined in claim 4 wherein said wiper means comprises a pair of arms each with foam rubber roller mounted at their extremities adapted to roll against said article and force the adhesive ends of said handle against said article, to secure said handle to said article.

6. An apparatus as defined in claim 1 wherein said anvil member comprises a substantially flat plate with a groove in the upper surface thereof into which said clamping member moves when in clamping position, said groove being wider than said clamping member, said clamping member when said clamping member moves into said groove to clamping position forms said handle into a substantially gull shape to hold the ends of said handle in an elevated position.

* * * * *